(12) United States Patent
Lange et al.

(10) Patent No.: US 10,622,595 B2
(45) Date of Patent: Apr. 14, 2020

(54) BATTERY MODULE HOUSING, BATTERY MODULE, COVER ELEMENT FOR A BATTERY MODULE HOUSING OF THIS TYPE OR FOR A BATTERY MODULE OF THIS TYPE, METHOD FOR PRODUCING A BATTERY MODULE OF THIS TYPE, AND BATTERY

(71) Applicant: Robert Bosch GmbH, Stuttgart (DE)

(72) Inventors: Ulrich Lange, Aichtal (DE); Alexander Reitzle, Neu-Ulm (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 15/577,509

(22) PCT Filed: May 24, 2016

(86) PCT No.: PCT/EP2016/061626
§ 371 (c)(1),
(2) Date: Nov. 28, 2017

(87) PCT Pub. No.: WO2016/193050
PCT Pub. Date: Dec. 8, 2016

(65) Prior Publication Data
US 2018/0145287 A1    May 24, 2018

(30) Foreign Application Priority Data
May 29, 2015    (DE) .......................... 10 2015 209 932

(51) Int. Cl.
*H01M 2/04* (2006.01)
*H01M 2/10* (2006.01)
(Continued)

(52) U.S. Cl.
CPC ......... *H01M 2/0473* (2013.01); *H01M 2/043* (2013.01); *H01M 2/0434* (2013.01);
(Continued)

(58) Field of Classification Search
None
See application file for complete search history.

(56) References Cited

U.S. PATENT DOCUMENTS 3,157,344 A    11/1964    Hennessey
9,190,193 B1 *    11/2015    Reitzel .................. H01B 17/38
(Continued)

FOREIGN PATENT DOCUMENTS

DE    102011056417    6/2013
DE    112012000438    10/2013
(Continued)

OTHER PUBLICATIONS

International Search Report for Application No. PCT/EP2016/061626 dated Jun. 28, 2016 (English Translation, 2 pages).

*Primary Examiner* — Jonathan G Leong
*Assistant Examiner* — Kirsten B Tysl
(74) *Attorney, Agent, or Firm* — Michael Best & Friedrich LLP

(57) ABSTRACT

The invention relates to a battery module housing which forms a first housing segment (21) and a second housing segment (22) which form accommodation spaces (3, 31, 32) that are separated from one another, each housing segment being used to accommodate at least one battery cell (13), wherein the battery module housing (1) is closable using a cover element (5) which forms a first cover segment (61) and a second cover segment (62). The first housing segment (21) is closable using the first cover segment (61) and the second housing segment (22) is closable using the second cover segment (62), wherein the cover element (5) has a dividing (Continued)

line (7) which is formed in such a way that the first cover segment (61) and the second cover segment (62) can be separated from one another along the dividing line (7).

21 Claims, 5 Drawing Sheets

(51) Int. Cl.
    *H01M 2/20*     (2006.01)
    *H01M 2/30*     (2006.01)
    *H01M 10/04*     (2006.01)

(52) U.S. Cl.
    CPC ....... *H01M 2/1061* (2013.01); *H01M 2/1077* (2013.01); *H01M 2/206* (2013.01); *H01M 2/305* (2013.01); *H01M 10/0431* (2013.01); *H01M 2220/20* (2013.01)

(56) References Cited

U.S. PATENT DOCUMENTS

| | | |
|---|---|---|
| 2004/0174136 A1 | 9/2004 | Mikuriya et al. |
| 2012/0177970 A1 | 7/2012 | Marchio et al. |
| 2012/0258353 A1* | 10/2012 | Yamashita .......... H01M 2/0275 |
| | | 429/176 |
| 2014/0292284 A1 | 10/2014 | Sawada |
| 2016/0197386 A1* | 7/2016 | Moon ................. H01M 2/1077 |
| | | 429/120 |
| 2016/0218328 A1 | 7/2016 | Schmidt et al. |

FOREIGN PATENT DOCUMENTS

| | | |
|---|---|---|
| DE | 102012213871 | 2/2014 |
| DE | 102012216316 | 3/2014 |
| DE | 102013016101 | 4/2015 |
| WO | 2007138520 | 12/2007 |
| WO | WO-2015030405 A1 * | 3/2015 |

* cited by examiner

BATTERY MODULE HOUSING, BATTERY MODULE, COVER ELEMENT FOR A BATTERY MODULE HOUSING OF THIS TYPE OR FOR A BATTERY MODULE OF THIS TYPE, METHOD FOR PRODUCING A BATTERY MODULE OF THIS TYPE, AND BATTERY

BACKGROUND OF THE INVENTION

The invention relates to a battery module housing. Subject matter of the present invention is also a battery module, a cover element for such a battery module housing or for such a battery module, a method for producing such a battery module and a battery.

The German printed publication DE 10 2011 056 417 A1 discloses a storage battery having one or a plurality of electrochemical storage cells. The storage battery has a housing comprising at least two accommodation spaces that are separated from one another by one or a plurality of housing walls. In so doing, one or a plurality of the accommodation spaces is designed as cell spaces, which are fitted in each case to the storage cell for receiving the electrochemical elements. The storage cells are connected in a series circuit with one another via respective cell connectors. In addition, busbars made of copper can be injection molded in a case cover part that covers the receiving spaces.

The German printed publication DE 10 2012 216 316 A1 discloses a cell housing for a battery cell, said cell housing being designed to receive electrolytes to be filled into the same and other electrochemical battery components, which are to be arranged in the cell housing for generating a battery voltage that is to be provided at the terminals of the battery cell. The terminals are arranged here on a cell cover.

Furthermore, the German printed publication DE 10 2012 213 871 A1 discloses a battery cell having a battery cell housing and an electrical conductor. In this case, the electrical conductor is connected within the battery cell housing to an electrode of the battery cell in an electrically conductive manner. In addition, the electrical conductor is guided through an opening in the battery cell housing out of the battery cell housing, and a plastic seal is cast between the electrical conductor and the battery cell housing.

SUMMARY OF THE INVENTION

The battery module housing, the battery module and the method of the invention have the advantage that a single cover segment of a cover element can be separated from adjacent cover segments. Should an individual battery cell of the battery module not satisfy the quality requirements after the formation process, it is therefore possible to separate the cover segment belonging to this battery cell from the adjacent cover segments and to replace the defective battery cell. As a result, the reject rate during the production of a battery module is thereby reduced because the rejection of a battery cell does not mean a rejection of the entire battery module during a quality test, but only the replacement of an individual battery cell is required.

According to the invention, a battery module housing is provided, which forms a first housing segment and a second housing segment. The first housing segment and the second housing segment form accommodation spaces that are separated from one another, each housing segment being used to accommodate at least one battery cell. Furthermore, the battery module housing is closable using a cover element which forms a first cover segment and a second cover segment. In so doing, the first housing segment is closable using the first cover segment and the second housing segment is closable using the second cover segment. In addition, the cover element has a dividing line which is formed in such a way that the first cover segment and the second cover segment can be separated from one another along the dividing line.

In this publication, a separation region can also be understood by a dividing line, said separation region being designed to separate the first cover segment from the second cover segment.

The dividing line is especially formed by a multiplicity of openings running continuously through the cover element or by weakened portions in the material of the cover element. Furthermore, a separation region can be understood by the dividing line in this publication. As a result, a simpler, faster and/or more precise separation of the first cover segment and the second cover segment from one another is possible along the dividing line, in particular in comparison to other separation methods, as, for example, laser cutting, cutting or sawing.

It is advantageous if the cover element has at least one voltage terminal. In this connection, the at least one voltage terminal is made of metal. The first cover segment and/or the second cover segment particularly have at least one voltage terminal. It is furthermore advantageous if the cover element, in particular the first cover segment and/or the second cover segment, has a first voltage terminal and a second voltage terminal, which are made of metal. Thus, an electrical connection to the battery cell accommodated in a housing segment is established via the at least one voltage terminal made of metal. In a preferred manner, the first voltage terminal and the second voltage terminal are used to tap a positive voltage and a negative voltage of the battery cell.

It is expedient if the battery module is constructed in one-piece; thus enabling the battery module housing to be simply and cost effectively produced. A design as a so-called monoblock module is therefore especially possible. In this connection, the one-piece construction of the battery module housing increases the mechanical stability thereof and thus no or only small additional measures are necessary for mechanically fixing the individual housing segments.

According to a further idea of the invention, the first housing segment and the second housing segment are arranged adjacent to one another. The first housing and the second housing segment are particularly arranged to be separable from one another, so that it is possible to replace a housing segment alternatively or additionally to the replacement of a cover segment, should the associated battery cell not satisfy the quality requirements after the formation process.

In an advantageous manner, the battery module housing has a plurality of housing segments and the battery module is closable using a cover element. The cover element has a plurality of cover segments and a plurality of dividing lines. Furthermore, the battery module housing can additionally be closed using a plurality of cover elements. In so doing, a cover element can also consist of only one cover segment, wherein a cover element advantageously has a plurality of cover segments. Hence, a battery module can consist of a plurality of battery cells connected in parallel or in series without the reject rate being raised during production. This results from the fact that a battery cell rejected during the function check can be simply replaced because the associated cover segment can be separated from the adjacent cover segments. Hence, an increase in the number of the battery cells does not mean an increase in the reject rate during production as is the case with the production of comparable battery modules having a cover element without a separation possibility of the cover segments.

It is advantageous if the battery module housing and/or the cover element are formed from plastic. The production as an injection-molded part is particularly advantageous. In so doing, the metallic voltage terminals can be integrated into the cover element during the injection molding process for producing the cover element.

The battery module housing and/or the cover element are especially made from a material with a thermal conductivity, for example, of 1 to 100 W/mK, preferably from 1 to 30 W/mK and particularly from 3 to 25 W/mK, such materials being known from the prior art.

It is expedient if the battery cell is accommodated in a foil. The foil is, for example, formed from a metallic material or contains a metallic material. In addition, the foil preferably has a thickness of 100 µm to 400 µm, and the foil has in particular a thickness of 150 µm to 300 µm and furthermore the foil has a thickness of 200 µm. In this context, foil can be particularly understood as a pouch foil which is described below.

A battery cell is particularly accommodated in a foil in the form of a so-called pouch foil. In addition, a battery cell is preferably designed as a wound cell, as a so-called jelly roll. A pouch foil preferably has a metallic layer, which is particularly formed from aluminum and has a thickness of 40 µm to 100 µm. Furthermore, the pouch foil preferably has an inner layer, which, for example, if formed from a polymer and particularly from polyethylene, polypropylene or polyamide and has a thickness of 75 µm to 91 µm and particularly a thickness of 80 µm. In so doing, the inner layer is arranged adjacent to the metallic layer on the side of the metallic layer facing the battery cell and is connected flat to the metallic layer. In particular, a protective layer can additionally be arranged between the metallic layer and the inner layer. Furthermore, the pouch foil can additionally have an outer layer, which, for example, is formed from as polymer and in particular from polyethylene, polypropylene, polyethylene terephthalate or polyamide and has a thickness of 10 µm to 20 µm and in particular a thickness of 12 µm. In so doing, the outer layer is arranged adjacent to the metallic layer on the side of the metallic layer facing away from the battery and is connected flat to the metallic layer. The metallic layer provides for an electrical conductivity of the pouch foil, and the inner layer and/or the outer layer form a protective or battery layer against moisture. The electrodes of the battery cell, in particular the jelly roll, are thereby wrapped in the pouch foil or stacked. In addition, the liquid electrolyte is also accommodated in the pouch foil, wherein the pouch foil seals the battery cell. A pouch foil known from the prior art can particularly be used.

The invention furthermore relates to a battery module having a battery module housing, which forms a first housing segment. In a preferred manner, the battery module additionally forms a second housing segment. The first housing segment and in particular the second housing segment are used to accommodate at least one battery cell. In addition, the at least one battery cell is accommodated in a foil which is formed from a metallic material or contains a metallic material, in particular a pouch foil. In addition, the battery module housing is closable using a cover element which forms a first cover segment and in particular a second cover segment. The first housing segment is closable using the first cover segment; and in a preferred manner, the second housing segment is closable using the second cover segment. Furthermore, the cover element has at least one voltage terminal, in particular a first voltage terminal and a second voltage terminal. In a preferred manner, the first cover segment and/or the second cover segment has the at least one voltage terminal. The first cover segment and the second cover segment particularly have a first voltage terminal and a second voltage terminal. In this connection, a connection strip electrically connects the at least one voltage terminal and the battery cell. This has the advantage that a simple establishment of an electrical connection between the at least one metallic voltage terminal and the battery cell is possible by means of the connection strip. In particular in the case of a battery cell, which can be accommodated in a pouch foil, this has the advantage that a battery cell can be arranged in a housing segment and can be easily electrically connected to the at least one voltage terminal of the cover element with the connection strip. In particular, a direct electrical connection of the jelly roll accommodated in a pouch foil to the at least one voltage terminal is thus possible by means of the connection strip. In a preferred manner, the connection strip is formed from copper and/or aluminum or contains copper and/or aluminum so that the connection strip is electrically conductive. The connection strip is particularly uncoated and formed from the same material as the electrodes of the battery cell.

A plurality of battery cells can particularly be accommodated in a housing segment, which can be arranged as a so-called battery stack. In this case, it is advantageous if each battery cell of the plurality of the battery cells accommodated in a housing segment is connected with a connection strip to a voltage terminal of the cover element, in particular to a first voltage terminal or to a second voltage terminal. In other words, this means that a plurality of battery cells, in particular the battery cells of a battery stack, is connected to a voltage terminal, wherein respectively one battery cell is connected with respectively one connection strip to the voltage terminal.

It is furthermore possible, to accommodate the entire battery module in a foil, preferably accommodated in a pouch foil, which ensures a sealing of the battery module. In particular, the battery module is advantageously wrapped in such a pouch foil so that the battery is sealed off with respect to the surroundings, in particular from moisture. It is also especially possible to accommodate a battery cell which is not accommodated in a pouch foil in a housing segment.

In a preferred manner, a cooling plate can especially be arranged on a bottom side of the battery module for the purpose of heat removal. Furthermore, it is possible in a preferred manner to integrate the cooling plate into the battery module, in particular an integration into the individual housing segments. In so doing, the cooling plate advantageously has cooling channels through which a fluid can flow so that an advantageous heat removal is possible. The cooling plate can be produced from the same material as the battery module housing. In addition, the cooling plate can also be produced from a metallic material so that the thermal conductivity is increased.

The invention further relates to a cover element for a battery module housing or for a battery module. The cover element forms a first cover segment and a second cover segment. Furthermore, the cover element, in particular the first cover segment and/or the second cover segment, has at least one metallic voltage terminal. The cover element preferably has a first voltage terminal and a second voltage terminal. The first cover segment and/or the second cover segment have particularly a first voltage terminal and a second voltage terminal. In addition, the cover element has a dividing line, which is formed by a plurality of openings that run continuously through the cover element or by weakened portions in the material of the cover element. In addition, the dividing line is designed in such a way that the first cover segment and the second cover segment are separable from one another along the dividing line. Thus, the individual cover segments can be separated from one another. The cover element is preferably designed as a plastic part, which is particularly produced by injection molding. Furthermore, the cover element is preferably designed as one piece. In this connection, the at least one metallic voltage terminal can be integrated into the cover element during the injection molding process.

The invention further relates to a battery module having a battery module housing, which forms a first housing segment and a second housing segment. The first housing segment and the second housing segment are thereby used to accommodate at least one battery cell, which is accommodated in a foil, in particular in a pouch foil, which is formed from a metallic material or contains a metallic material, wherein the battery module housing is formed from plastic, which has a thermal conductivity of 1 to 100 W/mK, preferably 1 to 30 W/mK and in particular of 3 to 25 W/mK. The first housing segment is furthermore closable using a first cover element, and the second housing segment using a second cover element, wherein the first cover element and the second cover element are made of a metallic material or plastic, have at least one voltage terminal, and a connection strip electrically connects the at least one voltage terminal to the battery cell. Hence, a simple replacement of battery cells is possible.

The invention furthermore relates to a method for producing a battery module having a battery module housing and a cover element. An electrical connection is initially established between the at least one voltage terminal and the battery cell that is accommodated in a housing segment. The battery module housing is then closed using the cover element so that the first cover segment closes the first housing segment and the second cover segment the second housing segment. A formation of the battery cell and subsequently a functional test of the battery cell are then carried out. In the event of the function requirements of a battery cell not being fulfilled, the first cover segment is separated from the second cover segment and the defective battery cell is replaced by a functioning battery cell. It is particularly possible to insert a battery cell that is already connected to a cover segment. The battery module housing is then irreversibly closed using the cover element.

It is advantageous if the connection strip connects the battery cell to the at least one voltage terminal. In this case, the battery cell is preferably designed as a jelly roll, and the jelly roll and the liquid electrolyte are accommodated in a pouch foil. In this way, the jelly roll can be easily electrically connected to the at least one voltage terminal, and the pouch foil ensures a sealing of the battery cell. It is thus possible to insert a battery cell which is already connected to a cover segment via the connection strip because the pouch foil seals the battery cell and thus no components of the battery cell can get out of the pouch foil. As a result, a faster and more reliable replacement of battery cells is possible.

The invention further relates to a battery having a battery module housing and having a cover element and/or a battery module.

It is possible to use any electrode materials, wherein silicon anodes are preferably used. In addition, anodes and cathodes containing carbon are preferred which are accommodated together with a liquid electrolyte in a pouch foil.

BRIEF DESCRIPTION OF THE DRAWINGS

Exemplary embodiments of the invention are depicted in the drawings and are explained in detail in the following description.

In the drawings.

DETAILED DESCRIPTION

Figure 1:
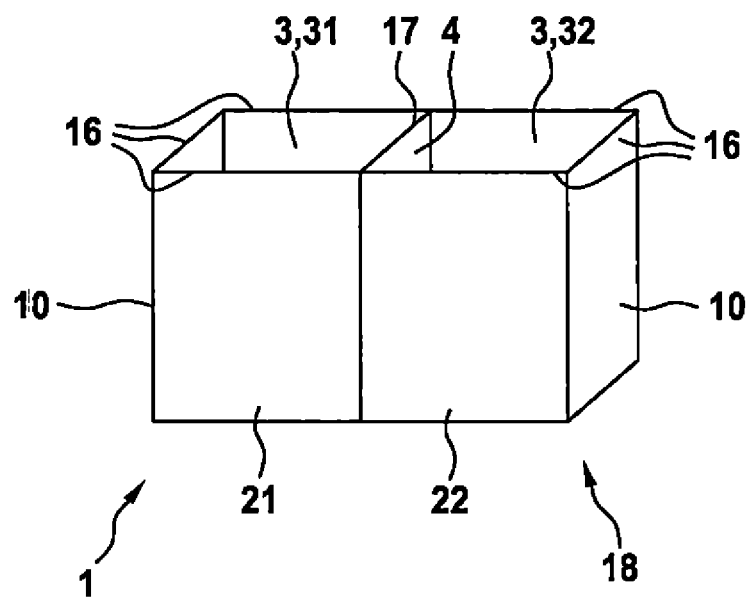
FIG. 1 shows a first exemplary embodiment of a battery module housing according to the invention, which is closable using a cover element.

FIG. 1 shows a first exemplary embodiment of a battery module housing 1 according to the invention.

The battery module housing 1 forms, for example, a first housing segment 21 and a second housing segment 22. The first housing segment 21 and the second housing segment 22 form accommodation spaces 3 that are separated from one another, in particular a first accommodation space 31 and a second accommodation space 32, which are used in each case to accommodate at least one battery cell 13, which is not shown in FIG. 1. Furthermore, a dividing wall 4 separates the first accommodation space 31 and the second accommodation space 32 from one another, which can be seen in FIG. 1. The battery module housing 1 furthermore has, for example, two end plates 10 which, as can be seen in FIG. 1, delimit the battery module housing 1.

The battery module housing 1 furthermore has outer edges 16, which are, for example, arranged on a top side of the end plates 10 and the housing segments 3. In addition, the battery module housing 1 has a separation edge 17 which is arranged on a top side of the dividing wall 4. The outer edges 16 and the separation edge 17 are used for connecting a cover element 5 to a battery module housing 1.

Figure 2:
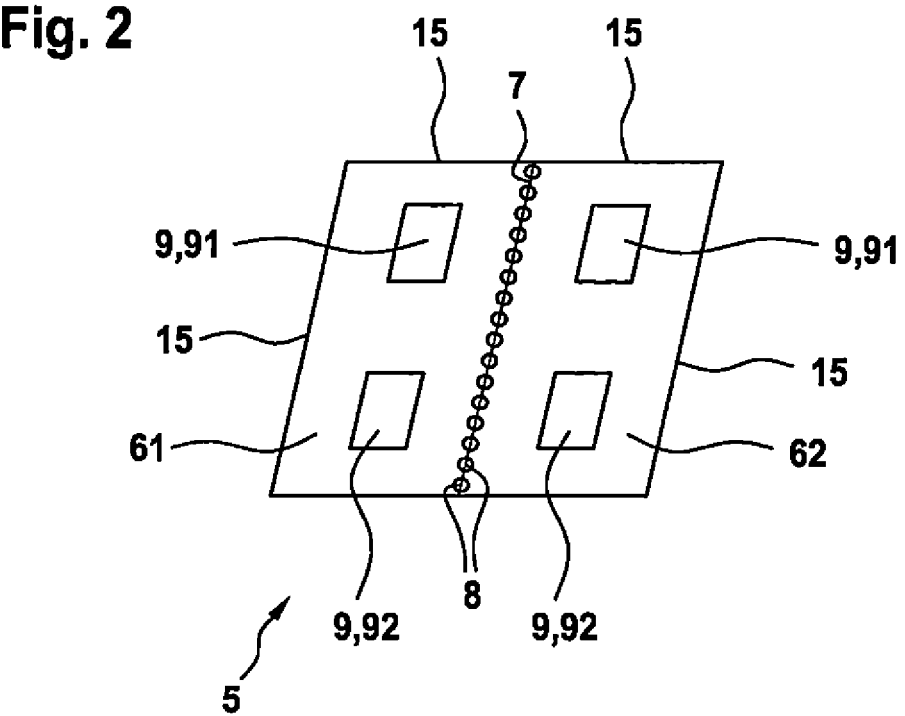
FIG. 2 shows a first exemplary embodiment of a cover element according to the invention for a battery module housing or for a battery module.

FIG. 2 shows a first exemplary embodiment of a cover element 5 according to the invention.

The cover element 5 is used to close a battery module housing 1. The battery module housing 1 shown in FIG. 1 is particularly closable using the cover element 5 shown in FIG. 2.

The cover element 5 forms a first cover segment 61 and a second cover segment 62. In so doing, the first cover segment 61 is used, for example, to close the first housing segment 21 of the exemplary embodiment from FIG. 1, and the second cover segment 62 is used to close the second housing segment 22 of the exemplary embodiment from FIG. 1.

Furthermore, the cover element 5 has a dividing line 7 which separates the first cover segment 61 from the second cover segment 62 and which is designed in such a way that the first cover segment 61 and the second cover segment 62 are separable from one another along the dividing line 7.

Figure 6A:
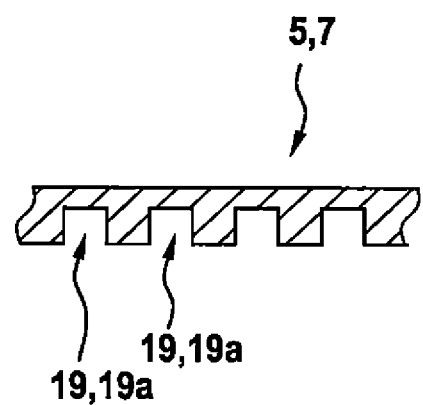
FIGS. 6a and 6b show sectional views of an embodiment of a cover element along a dividing line.

As can be seen in FIG. 2, the dividing line 7 can be formed by a plurality of openings 8 that run continuously through the cover element 5. It is furthermore possible that the dividing line 7 is formed by defined weakened portions in the material of the cover element. The dividing line 7 is preferably weakened in such a way that the layer thickness of the dividing line 7 is, for example, between 0.25 times and 0.75 times of the layer thickness of a non-weakened point of the cover element 5 and furthermore corresponds in particular to 0.5 times of the layer thickness of a non-weakened point of the cover element. In addition, FIG. 6 particularly shows sectional views of cover element 5 along the dividing line 7. In so doing, the FIGS. 6a) and 6b) show options for configuring the dividing line 7. The dividing line 7 preferably has, as shown in FIG. 6, recesses 19, which can be preferably designed angularly as is shown in FIG. 6 a) and/or round as is shown in FIG. 6 b).

As can be seen in FIG. 2, the cover element 5 has at least one voltage terminal 9. The cover element 5 preferably has a first voltage terminal 91 and a second voltage terminal 92. As can be seen in FIG. 2, the first cover segment 61 and the second cover segment 62 particularly have in each case a first voltage terminal 91 and a second voltage terminal 92.

The at least one voltage terminal 9, in particular the first voltage terminal 91 and the second voltage terminal 92, is of metal construction. The voltage terminal 9, 91, 92 is preferably made from aluminum and/or copper or contains aluminum and/or copper.

Furthermore, the cover element 5 has outer edges 16 which are used for an irreversible connection to a battery module housing 1.

Figure 3:
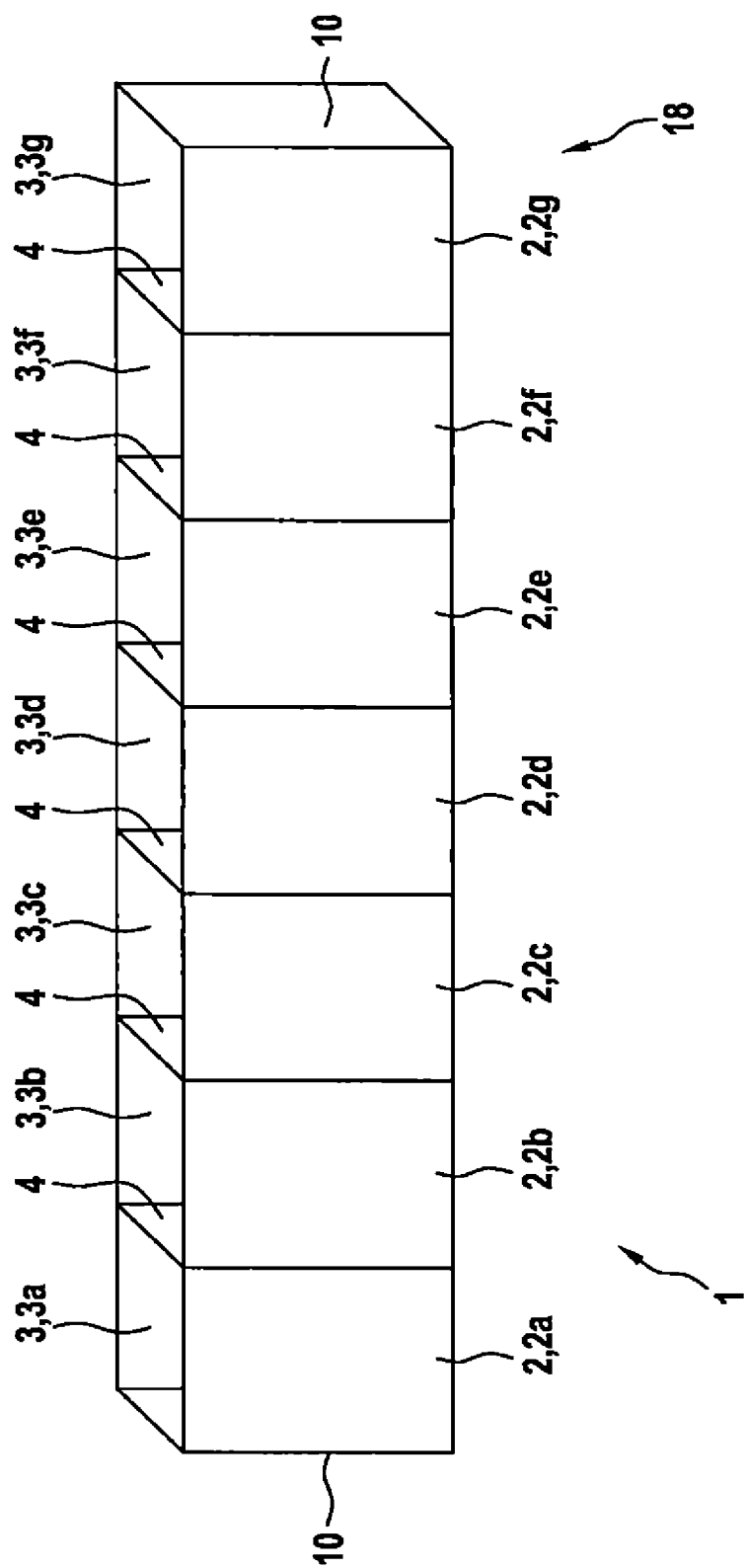
FIG. 3 shows a second exemplary embodiment of a battery module housing according to the invention, which is closable using a cover element.

FIG. 3 shows a second exemplary embodiment of a battery module housing 1 according to the invention.

The battery module housing 1 from FIG. 3 has a plurality of housing segments 2. Furthermore, a housing segment 2a, 2b, 2c, 2d, 2e, 2f, 2g forms in each case an accommodation space 3a, 3b, 3c, 3d, 3e, 3f, 3g so that the battery module housing 1 has a plurality of accommodation spaces 3. The battery module housing 1 shown in FIG. 3 forms seven housing segments 2, which further form in total seven accommodation spaces 3. The battery module housing 1 according to the invention is not limited to the formation of seven housing segments 2 nor to the formation of seven accommodation spaces, but can have an arbitrary number of housing segments 2 and accommodation spaces 3.

A dividing wall 4 separates in each case two adjacent housing segments 2 from one another in the second exemplary embodiment shown in FIG. 3.

The battery module housing 1 furthermore has two end plates 10 which delimit the battery module housing 1.

The second exemplary embodiment of a battery module housing 1 shown in FIG. 3 differs from the first exemplary embodiment of a battery module housing 1 shown in FIG. 1 by the number of the housing segments 2, the number of the accommodation spaces 3 formed and the number of the dividing walls 4.

A battery module housing 1 is preferably constructed in one piece. The battery module housing 1 can particularly be made of plastic. The exemplary embodiments shown in FIGS. 1 and 3 of a battery module housing constructed in one piece are therefore referred to as monoblock modules.

Figure 4:
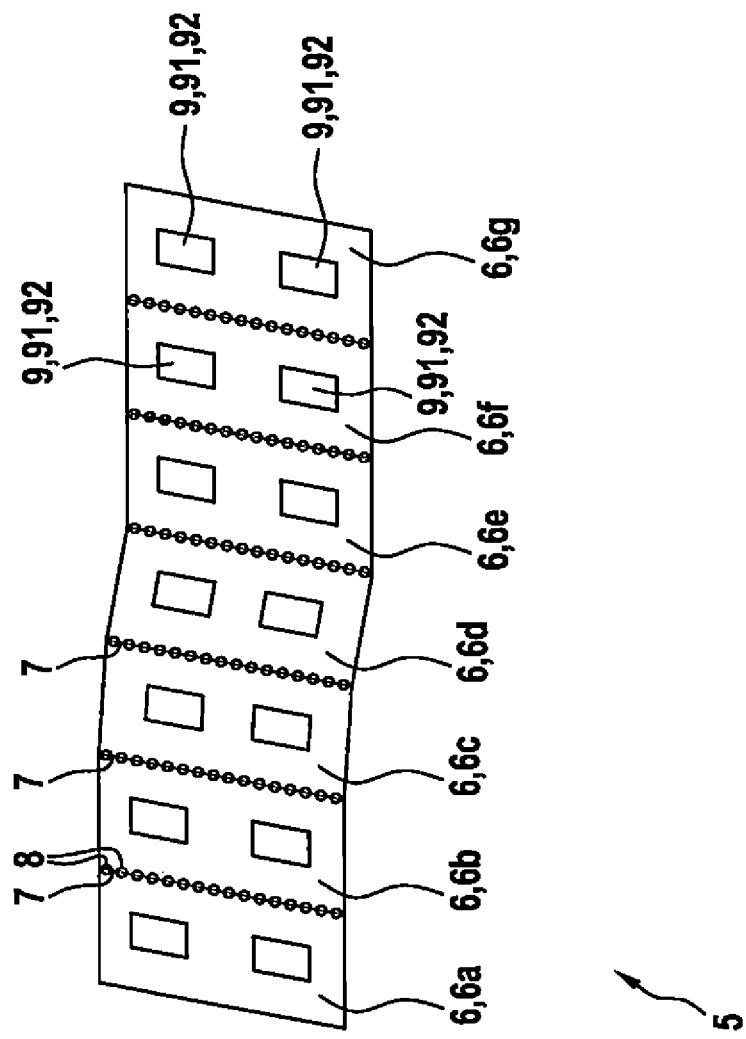
FIG. 4 shows a second exemplary embodiment of a cover element according to the invention for a battery module housing or for a battery module.

FIG. 4 shows a second exemplary embodiment of a cover element 5 according to the invention.

The battery module housing 1 which is shown in FIG. 3 is particularly closable using the cover element 5 shown in FIG. 4.

The cover element from FIG. 4 is formed by a plurality of cover segments 6. In addition, a cover segment 6a, 6b, 6c, 6d, 6e, 6f, 6g is used in each case to close a housing segment 2a, 2b, 2c, 2d, 2e, 2f, 2g. The housing segment 2a is particularly closable using the cover segment 6a, the housing segment 2b using the cover segment 6b, the housing segment 2c using the cover segment 6c, the housing segment 2d using the cover segment 6d, the housing segment 2e using the cover segment 6e, the housing segment 2f using the cover segment 6f and the housing segment 2g using the cover segment 6g.

In addition, the second exemplary embodiment of a cover element 5, which is shown in FIG. 4, has a plurality of dividing lines 7. A dividing line 7 divides in each case two adjacent cover segments 6.

Furthermore, a dividing line 7 can be formed by a plurality of openings running continuously through the cover element 5 or by defined weakened portions in the material of the cover element 5.

As can be seen in FIG. 4, the cover element 5 has at least one voltage terminal 9. The cover element 5 preferably has a first voltage terminal 91 and a second voltage terminal 92. As can be seen in FIG. 4, each cover segment particularly has a first voltage terminal 91 and a second voltage terminal 92. In so doing, a first voltage terminal 91 of a first cover segment 6 can be arranged adjacent to a first voltage terminal 91 of a second cover segment 6 or adjacent to a second voltage terminal 92 of a second cover segment 6.

The at least one voltage terminal 9, in particular the first voltage terminal 91 and the second voltage terminal 92 is made of metal. The voltage terminal 9, 91, 92 is preferably formed from aluminum and/or copper or contains aluminum and/or copper.

The second exemplary embodiment of a cover element 5 shown in FIG. 4 forms 7 cover segments 6 and has 6 dividing lines 7. The cover element 5 according to the invention is not limited to the configuration of 7 cover segments 6 or to 6 dividing lines 7 but can have an arbitrary number of cover segments 6. The second exemplary embodiment shown in FIG. 4 of a cover element 5 according to the invention differs from the first exemplary embodiment of a cover element 5 according to the invention shown in FIG. 2 by the number of the cover segments 6 and with it the number of the dividing lines 7.

The cover element 5 shown in FIGS. 2 and 4 is preferably made of plastic, and a metallic voltage terminal 9, 91, 92 can be integrated into the cover element 5 during the production of the cover element 5, in particular by injection molding. The cover element 5 is particularly constructed in one piece.

Figure 5:
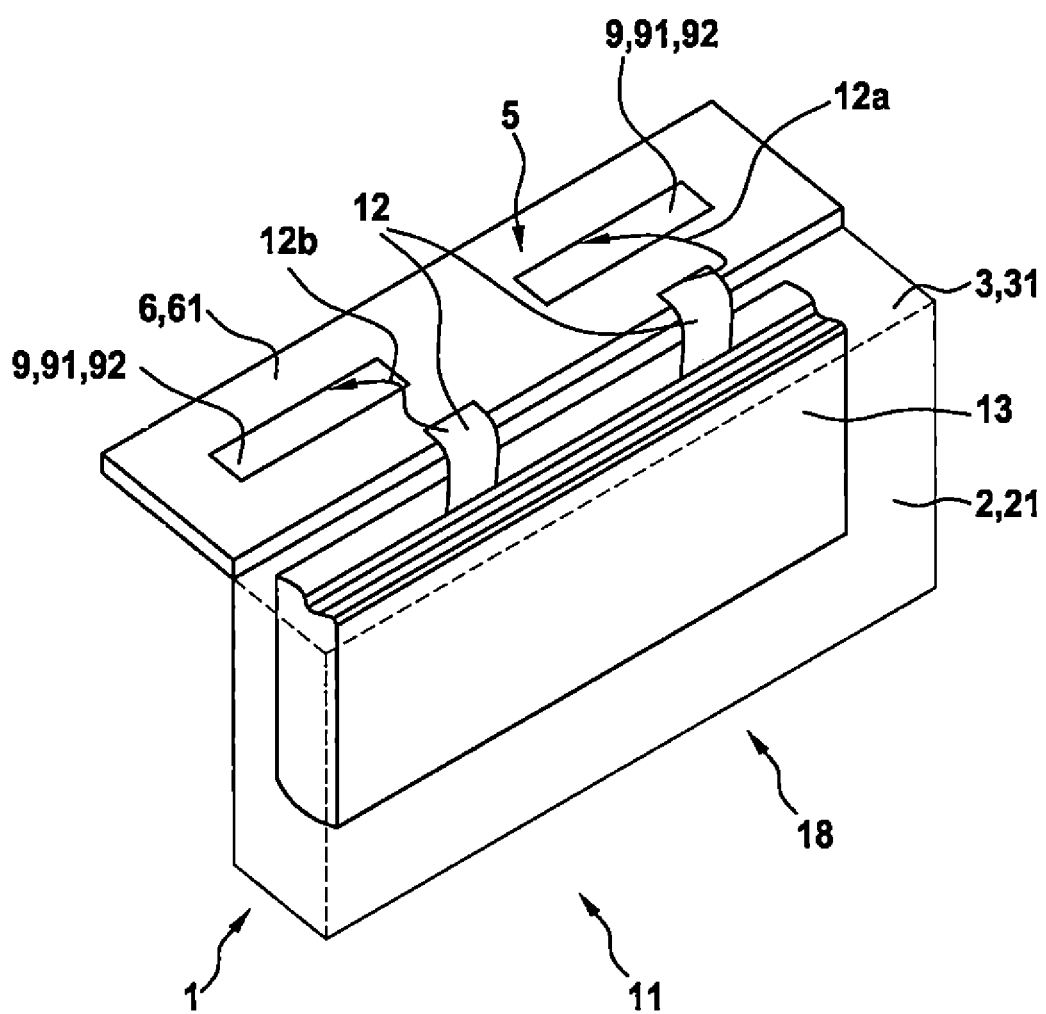
FIG. 5 shows an exemplary embodiment of a battery module according to the invention, in which a connection strip establishes an electrical connection between at least one voltage terminal of a cover element and a battery cell

FIG. 5 shows an exemplary embodiment of a battery module 11 according to the invention. The battery module 11 has a battery module housing 1 according to the invention, which is particularly shown in FIGS. 1 and 3 and is supported by their description. The battery module housing 1 of the battery module 11 forms at least one housing segment 2, in particular a first housing segment 21, which forms an accommodation space 3, in particular a first accommodation space, which is used to accommodate at least one battery cell 13.

The electrodes of the battery cell 13 are preferably accommodated in a pouch foil that is described above, and a battery cell 13 is particularly designed as a wound cell, a so-called jelly roll. In addition, the liquid electrolyte of the battery cell 13 is accommodated in the pouch foil, wherein the pouch foil seals the battery cell 13. The top side of the pouch foil is not depicted in FIG. 5 so that the jelly roll is visible. Before inserting the battery cell 13 into the accommodation space 3, the electrodes of the battery cell, in particular the jelly roll, and the liquid electrolyte are received in a pouch foil, which is then closed. Due to the accommodation of a battery cell 13 in a pouch foil, it is not necessary to fill the liquid electrolyte through an opening in a cover segment 6 of the cover element 5 into the accommodation space 3.

The battery module housing 1 of the battery module 11 is particularly closable using a cover element 5, which is particularly shown in FIGS. 2 and 4 and supported by the description thereof. The cover element 6 forms at least one cover segment 6, in particular a first cover segment 61. In this case, the first housing segment 21 is closable using the first cover segment 61. In addition, the cover segment 6, in particular the first cover segment 61, has at least one voltage terminal 9. The first cover segment 61 particularly has a first a first voltage terminal 91 and a second voltage terminal 92. The voltage terminal 9, 91, 92 is made of metal. The voltage terminal 9, 91, 92 is preferably made of copper and/or aluminum or contains copper and/or aluminum.

As can be seen in FIG. 5, a connection strip 12 electrically connects the voltage terminal 9, 91, 92 and the battery cell 13, as is illustrated by the arrows 12a and 12b. The connection strip 12 preferably electrically connects the voltage terminals 9, 91, 92 and the electrodes of the battery cell 13, in particular the jelly roll, directly to one another.

The establishment of the connection of the connection strip 12 to the voltage terminal 9, 91, 92 and the connection of the connection strip 12 to the electrodes of the battery cell 13, in particular the pouch foil, can take place by welding, adhesive bonding, soldering and other methods known from the prior art. In addition, it is also possible for the connection strip 12 to be self-adhesive.

The battery module housing 1 of the battery module 1 can furthermore form a first housing segment 21 and a second housing segment 22, which in each case are used to accommodate at least one battery cell 13. In addition, the battery module housing 1 is closable using a cover element 5, the cover element 5 forming a first cover segment 21 and a second cover segment 22, which have a metallic voltage terminal 9, 91, 92. The first housing segment 21 is thereby closable using the first cover segment 61 and the second housing segment 22 using the second cover segment. As described above, a connection strip 12 can electrically connect a battery cell 13 accommodated in a housing segment 21, 22 to the metallic voltage terminal 9, 91, 92. The battery module housing 1 preferably has a plurality of housing segments 2.

The voltage terminals 9, 91, 92 of the cover element 5 can furthermore be electrically connected to one another by means of the methods known from the prior art, in particular by bonding, in order to connect the battery cells 13 of the battery module 11 in series or in parallel.

A cooling plate can particularly be disposed on an underside 18 of the battery module housing 1 and/or the underside of the battery module housing 1 is made from thermally conductive plastic so than an effective heat removal is possible.

In order to produce a battery module 11 according to the invention having a battery module housing 1 shown in FIGS. 1 and 3 and with a cover element particularly shown in FIGS. 2 and 4, an electrical connection is initially established between a voltage terminal 9, 91, 92 and a battery cell 13. The electrodes of the battery cell 13 are preferably configured as a jelly roll, and the battery cell 13 is accommodated in a pouch foil; and in so doing, a connection strip 12 particularly connects the battery cell to the voltage terminal 9, 91, 92. The battery module housing 1 is subsequently closed using the cover element 5 so that in each case a cover segment 6 closes a housing segment and the battery cell 13 is accommodated in the interior of the housing segment 2, in particular in an accommodation space 3. A first cover segment 61 therefore closes a first housing segment 21 and a second cover segment 62 closes a second housing segment 22. A formation of the battery cell 13 is then carried out. The formation of a battery cell 13 refers here to the conversion of the active material of a newly produced battery cell 13 into an improved form for the energy conversion processes taking place. In this connection, a first charging cycle or a plurality of first charging cycles at a controlled temperature and a controlled current flow effect a conversion of the microstructure of the active components, in particular of the electrodes. Hence, the contact between the electrolyte and the electrodes can be improved and the internal resistance of the battery cell 13 can be reduced. Should it be determined in a subsequent functional test that a single battery cell 13 does not satisfy the requirements, the cover segment 6 belonging to this battery cell 13 can be separated along the dividing line 7 from the adjacent cover segments 6, and the battery cell 13 can be replaced by a functioning battery cell 13 in a simple manner. Thus, the rejection of a battery cell does not mean a rejection of the entire battery module 11. Then the battery module housing 1 of the battery module 11 is irreversibly closed using the cover element 5.

For the purpose of closing, the cover element 5 of the battery module 1 is welded along the outer edges 15 of the individual cover segments 6 and along the dividing lines 7 of the cover element 5 with the battery module housing 1 of the battery module 11, so that the cover element 5 along the outer edges 15 is irreversibly connected to the outer edges 16 of the battery module housing 1 and is connected along the dividing line 7 to the dividing edges 17 of the battery module housing 1.

Particularly in the case of battery cells 13, which are accommodated in a pouch foil, it is possible to irreversibly connect, in particular to weld, the cover element 5 only along the outer edges 15 of the same to the outer edges 16 of the battery module 1 because the pouch foil seals a battery cell 13.

The dividing walls 4, the walls of the housing segments 2 and end plates 10 in the Figures described above preferably have a wall thickness of 2 to 20 mm. Each housing wall of the battery module can particularly have as wall thickness of 2 to 20 mm.

Figure 6B:
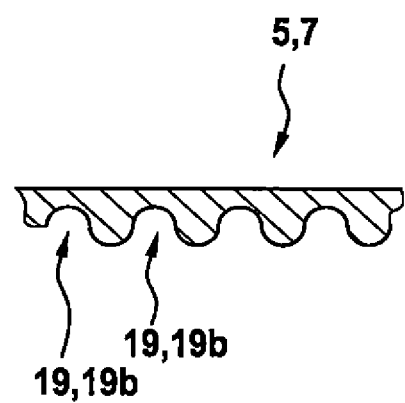

FIGS. 6a and 6b show options for configuring the dividing line 7. The dividing line 7, as shown in FIG. 6, preferably has recesses 19, 19a, 19b which, as shown in FIG. 6a), can be configured as angular recesses 19a and/or, as shown in FIG. 6b), can be configured as round recesses 19b.

The battery module according to the invention can be used for batteries in mobile applications, in particular in electric vehicles and E-bikes, and for batteries for use in stationary operations.

The invention claimed is:

1. A battery module housing comprising a first housing segment (21) and a second housing segment (22) which form accommodation spaces (3, 31, 32) that are separated from one another, each housing segment being used to accommodate at least one battery cell (13), wherein the battery module housing (1) is closable using a cover element (5) which forms a first cover segment (61) and a second cover segment (62), wherein the first housing segment (21) is closable using the first cover segment (61) and the second housing segment (22) is closable using the second cover segment (62), characterized in that the cover element (5) is weakened along a dividing line (7) such that the first cover segment (61) and the second cover segment (62) are configured to be separated from one another along the dividing line (7), wherein the cover element (5) has at least one voltage terminal (9) mounted thereon, and wherein the at least one voltage terminal (9, 91, 92) is made of metal.

2. The battery module housing according to claim 1, characterized in that the battery module housing (1) is constructed in one piece and/or the first housing segment (61) and the second housing segment (62) are arranged adjacent to one another.

3. The battery module housing according to claim 1, characterized in that the battery module housing (1) has a three or more housing segments (2) and the battery module housing (1) is closable using a cover element (5) which has a three or more cover segments (6) and a plurality of dividing lines (7).

4. The battery module housing according to claim 1, characterized in that the battery module housing (1) and/or the cover element (5) are made from plastic which has a thermal conductivity from 1 to 100 W/mK.

5. The battery module housing according to claim 1, characterized in that the battery cell (13) is accommodated in a foil which is formed from a metallic material or contains a metallic material.

6. The battery module housing according to claim 1, characterized in that the at least one voltage terminal includes a first voltage terminal (91) and a second voltage terminal (92), wherein the first cover segment (61) and/or the second cover segment (62), has the first voltage terminal (91) and the second voltage terminal (92).

7. The battery module housing according to claim 1, characterized in that the battery module housing (1) and/or the cover element (5) are made from plastic which has a thermal conductivity from 1 to 30 W/mK.

8. The battery module housing according to claim 1, characterized in that the battery module housing (1) and/or the cover element (5) are made from plastic which has a thermal conductivity from 3 to 25 W/mK.

9. The battery module housing according to claim 1, characterized in that the battery cell (13) is accommodated in a pouch foil, which is formed from a metallic material or contains a metallic material and which has a thickness of 10 μm to 400 μm.

10. The battery module housing according to claim 1, characterized in that the battery cell (13) is accommodated in a pouch foil, which is formed from a metallic material or contains a metallic material and which has a thickness of 20 μm to 200 μm.

11. The battery module housing according to claim 1, wherein the dividing line (7) is formed by a plurality of openings (8) that run continuously through the cover element (5).

12. The battery module housing according to claim 1, wherein the dividing line (7) is formed by a plurality of recesses (19) in the cover element (5).

13. The battery module housing according to claim 12, wherein the plurality of recesses (19) are configured as angular recesses (19a).

14. The battery module housing according to claim 12, wherein the plurality of recesses (19) are configured as round recesses (19b).

15. The battery module housing according to claim 1, wherein the dividing line (7) is defined by a weakened portion of the cover element (5).

16. A battery module according to claim 15, wherein the weakened portion of the cover element (5) has a layer thickness that is between 0.25 times and 0.75 times a layer thickness of a non-weakened point of the cover element (5).

17. A battery module according to claim 15, wherein the weakened portion of the cover element (5) has a layer thickness that is approximately one-half of a layer thickness of a non-weakened point of the cover element (5).

18. A method for producing a battery module, having a battery module housing according to claim 1 and having a cover element, wherein the cover element forms a first cover segment (61) and a second cover segment (62), wherein the first cover segment (61) and/or the second cover segment (62) have at least one voltage terminal (9, 91, 92), and wherein the cover element (5) has a dividing line (7) which is formed by a plurality of openings (8) that run continuously through the cover element (5) or by weakened portions in the material of the cover element (5), and such that the first cover segment (61) and the second cover segment (62) are separable from one another along the dividing line (7), the method comprising
   initially establishing an electrical connection between the at least one voltage terminal (9, 91, 92) and the battery cell (13) accommodated in a housing segment (2, 21, 22),
   then closing the battery module housing (1) using the cover element (5) so that the first cover segment (61) closes the first housing segment (21) and the second cover segment (62) the second housing segment (22),
   then forming the battery cell (13),
   subsequently carrying out a functional test of the battery cell (13),
   then if the functional requirements of a battery cell (13) are not fulfilled, separating the first cover segment (61) from the second cover segment (62) and replacing the defective battery cell (13), and
   then irreversibly closing the battery module housing (1) using the cover element (5).

19. The method according to claim 18, characterized in that a connection strip (12) electrically connects the battery cell (13) to the at least one voltage terminal (9, 91, 92).

20. A battery having a battery module housing according to claim 1 and having a cover element, wherein the cover element forms a first cover segment (61) and a second cover segment (62), wherein the first cover segment (61) and/or the second cover segment (62) have at least one voltage terminal (9, 91, 92), characterized in that the cover element (5) has a dividing line (7) which is formed by a plurality of openings (8) that run continuously through the cover element (5) or by weakened portions in the material of the cover element (5), and such that the first cover segment (61) and the second cover segment (62) are separable from one another along the dividing line (7).

21. A battery having a battery module housing according to claim 1 and having a battery module that forms a first housing segment (21), wherein the first housing segment (21) are used to accommodate at least one battery cell (13) which is accommodated in a foil, wherein the battery module housing (1) is closable using a cover element (5) which forms a first cover segment (61), wherein the first housing segment (21) is closable using the first cover segment (61); and the cover element (5) has at least one voltage terminal (9), characterized in that a connection strip (12) electrically connects the at least one voltage terminal (9, 91, 92) to the battery cell (13).

\* \* \* \* \*